A. H. PAPE.
CONVERTIBLE AUTOMOBILE TOP.
APPLICATION FILED MAR. 29, 1920.
1,363,909.
Patented Dec. 28, 1920.
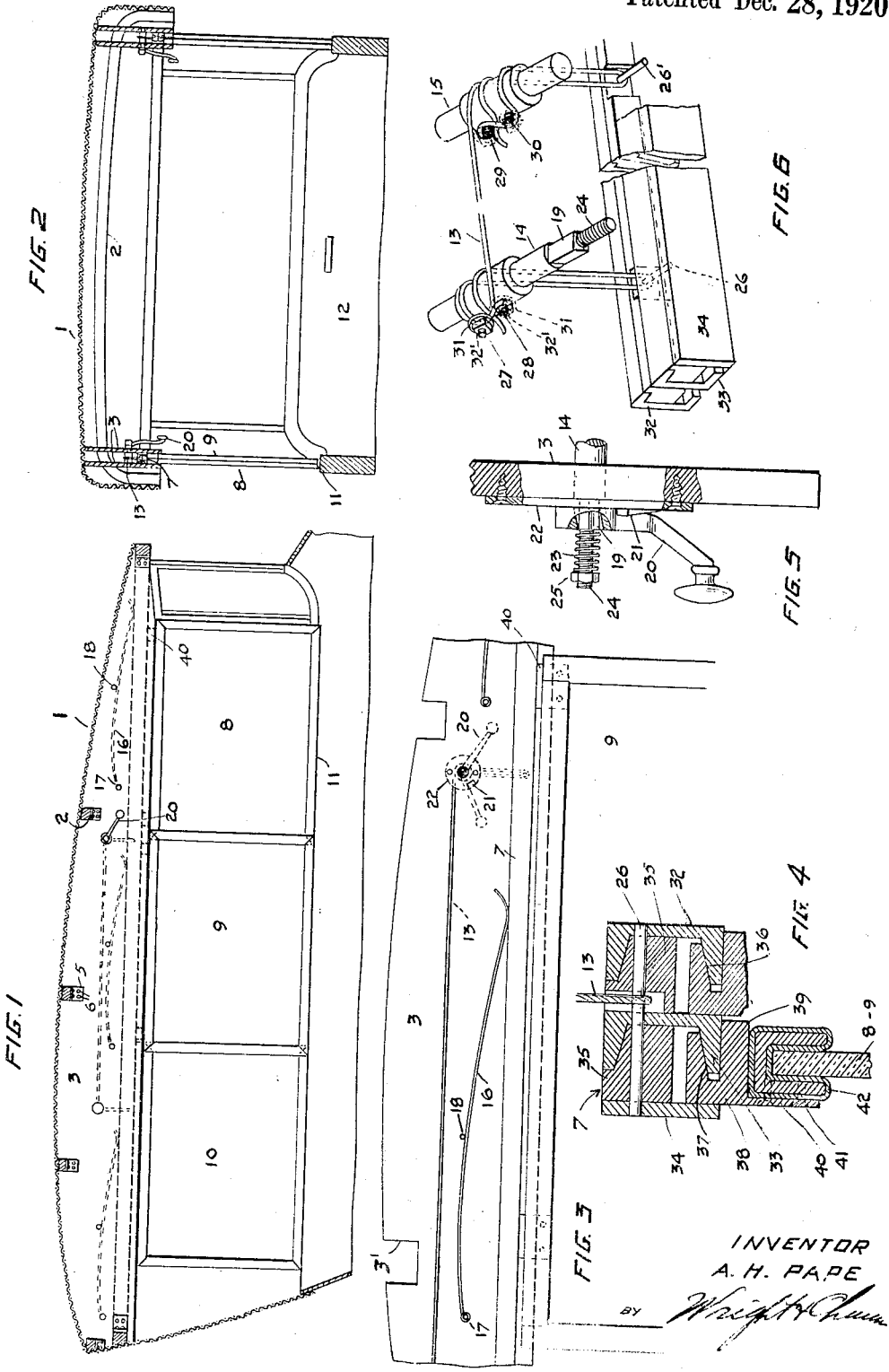
INVENTOR
A. H. PAPE

UNITED STATES PATENT OFFICE.

AUGUST H. PAPE, OF KENTFIELD, CALIFORNIA.

CONVERTIBLE AUTOMOBILE-TOP.

1,363,909.  Specification of Letters Patent.  Patented Dec. 28, 1920.

Application filed March 29, 1920. Serial No. 369,661.

*To all whom it may concern:*

Be it known that I, AUGUST H. PAPE, a citizen of the United States, residing at Kentfield, in the county of Marin and State of California, have invented new and useful Improvements in Convertible Automobile-Tops, of which the following is a specification.

This invention relates to improvements in automobile tops and more particularly to means for converting an open collapsible top or a rigid top open on its sides into a closed top.

The primary object of this invention is to provide relatively simple, inexpensive, easily operable, means of the character described for quickly and neatly converting an open automobile of the touring type into a closed car of the limousine or sedan type, said means being incorporated in the ordinary type of top in such a manner that the automobile may be used as an open or a closed car, as desired.

The invention possesses other advantages and features, some of which, with the foregoing, will be set forth at length in the following description wherein I shall outline in full that form of the invention which I have selected for illustration in the drawings accompanying and forming a part of the present specification. In said drawings, I have shown one form of the construction of my invention, but it is to be understood that I do not limit myself to such form, since the invention as expressed in the claims may be embodied in a plurality of forms.

Referring to the drawings:

Figure 1 is a fragmentary longitudinal sectional view taken through an automobile, illustrating my invention applied thereto.

Fig. 2 is a cross sectional view of the top, showing a part of the automobile incorporated therewith.

Fig. 3 is an enlarged detail fragmentary side elevation of my invention.

Fig. 4 is a fragmentary sectional view of the track showing a portion of one of the windows attached thereto.

Fig. 5 is a fragmentary top plan view broken away and in section, showing means for operating the device.

Fig. 6 is a fragmentary perspective view of the operating means, showing it attached to the track.

Referring particularly to the drawing, 1 designates an ordinary cloth or fabric top of an automobile, and 2 the usual bows for supporting the top.

The foundation of my improved means for converting the top into a closed car comprises a pair of boards or plates 3 secured within the top on each side and extending parallel with the sides of said top. The lower edges of these plates are straight and the upper edges are curved to conform to the curvature of the top. The upper edges of the plates or boards are notched, as at 3', so as to receive the bows 2 and said boards are secured to the bows by angle irons 5, the latter being held by fastening elements 6. These angle irons secure the boards in slightly spaced relation to one another in each pair, so as to provide guideways for longitudinal side window supporting members 7.

The members 7 are resiliently supported for vertical movement between the boards 3 of each pair having sliding contact with said boards, and slidably support a front window 8 and a middle window 9. The sides of the car at the back are inclosed by a stationary window 10, the members 7 extending along the inside of said windows 10.

As a means for supporting the members 7 with the windows 8 thereon in such position that the windows are free to be moved into operative positions out of contact with the upper edge 11 of the body 12 of the automobile, I employ a flexible supporting element or cable 13, secured to said member 7, and connected with the boards 3. One end of this cable 13 is fixed to a shaft 14 that is mounted transversely in the boards 3 of each pair of boards and the other end is secured to a similar shaft 15 similarly mounted at a spaced point between the boards of each pair, the intermediate portions of the cable being connected with the member 7 at points preferably immediately below the shafts 14 and on opposite sides of the center of the members 7, between the ends and said center, so as to balance said members 7 as well as to support them. This means holds the members 7 in up position, out of contact with the body of the car and against the action of leaf springs 16. These springs 16 are each secured at one end, as at 17, to the boards 3 and at their other ends bear downwardly upon the members 7, there being provided stop pins 18 engaging the upper sides of the springs adjacent to the forward ends thereof so as to effect the downward pressure of the springs upon the members 7. One end of the shaft 14 is extended through the innermost board 3 of each side of the automobile and is angularly formed, as at 19, so as to receive a crank handle 20. This handle 20 is slidable longitudinally on the shaft, so as to coöperate with the locking lug 21 formed on a plate 22 against which said crank arm operates. An expansion spring 23 is mounted upon an extension 24 of the shaft 14 and bears at its ends against a nut 25 on said extension and upon the handle 22 so as to normally hold said handle in against the plate 22. By turning the handle 21, the shaft 14 is rotated so that the cable 13 is operated to raise or lower the members 7. When the members 7 are raised, the handle 20 is first pulled outwardly against the action of the spring so as to pass over the lug 21, and after passing over said lug, is allowed to be moved back into normal position by the spring so as to maintain shafts 14 and 15 and cable 13 in the position to hold the member 7 in up-position.

The cable 13, beginning from the end thereof, which is secured to the shaft 14, extends over said shaft and downwardly, and under a pin or bolt 26 on the member 7, around said bolt and upwardly over the top of said shaft, and around and under a pin or screw 27, which latter is fixed to the shaft. Then back over and around a similar pin or screw 28 and over the top of the shaft 14 and on to and around the shaft 15. After extending around the shaft 15, the cable passes under and around a pin or screw 29 similar to the one 27 and then passes under a similar screw 30 mounted to one side of the screw 29. From this point, the cable passes over the top of said shaft 15 and downwardly and under a pin 26' similar to the one 26 upon the member 7. From this point, the cable extends upwardly, over the top of said shaft 15 and terminates in a loose end, which end is held under a secured or fixed portion of the cable. The other end is also extended under a secured or fixed portion, as shown in Fig. 6. The flexible element or cable is securely fastened to the shafts 14 and 15 by washers 31' mounted upon the pins 27, 28, 29, and 30. The washers are pressed into engagement with the cable by nuts 32' turned on said bolts or pins. By loosening the nuts and washers, adjustment of the cable 13 may be effected, as desired, to regulate the lifting and lowering of the windows and the elevation at which the windows may be supported. This adjustment may be necessary at times to effect proper balance of the members 7. By arranging the cable in this manner, when the shaft 14 is rotated in a counter clockwise manner, the cable will be wound upon both shafts, so as to pull up on the member 7. The clockwise movement of the shaft 14 and the downward pull of the springs 16 unwinds the cable, so as to move the members 7 and windows downwardly.

When the windows 8 and 9 are not extended to inclose the automobile, they lie side by side inside the window 10 and with the lower edges elevated from the upper edges 11 of the body 12 of the automobile, as shown in dotted lines in Fig. 1. In this position, the windows may be moved on the member 7 into their respective positions and when in such positions, by releasing the crank 20 on each side of the case from locking engagement with the lugs 21 and turning said cranks in a clockwise direction, the cable is unwound, and permits the springs 16 to force the windows downwardly and into engagement with the upper edges 11 of the body 12. By having the windows yieldingly pressed or forced downwardly, they are prevented from rattling and are securely held in place. To raise the windows, it is only necessary to give the crank handles 20 a slight turn and to allow them to lock behind the lugs 21. This raises the member 7 with the windows attached thereto, so that the lower edges of the members are free from contact with the upper edges 11 of the body 12 and the windows may be moved back into out-of-way position.

I preferably form the member 7 of two channel iron bars 32 and 33, and a straight plate 34 equal in height to that of the channel bars. These plates and bars are secured together by the pins or bolts 26, which extend through apertures in said members and through similar apertures in wooden blocks 35 which blocks are interposed between the plate 34 and bars 32 and 33, and space said bars and plates from one another. The lower flanges of the channel bars 32 and 33 provide tracks or guideways 36 and 37 for slide blocks 38, to which blocks are secured the windows 8 and 9. The slide blocks 38 are provided with longitudinal side-opening grooves 39 which receive the tracks 36 and 37. The faces of said blocks opposite to said grooves having sliding engagement with the opposed faces of the plate 34 and channel bar 33 respectively. The blocks 38 are provided with depending extensions 40, to which are secured by suitable fastening elements 41, the frame pieces 42 of the windows 8 and 9. Both of the tracks extend for the length of the boards 3, so that the front window 8 and the window 9 may be moved into position.

It will thus be seen that I have provided exceptionally simple and efficacious means for slidably supporting side windows in an open automobile top, whereby said windows will, when not in use, be in an out-of-way position, and when desired for use, may be easily and quickly extended so as to inclose the car.

I claim:

1. The combination with the top of an automobile having open sides, of guide members secured to the frame of said top on each side of the automobile, a window supporting member slidably mounted between the guide members, windows supported by said members and having their lower edges disposed so as to be movable over the upper edge of the body of the automobile, means for holding said supporting members in up-position whereby the lower edges of the windows are spaced from the upper edge of the body of the automobile, and spring means for depressing said track to press the lower edges of the windows against the upper edges of the body of the automobile.

2. The combination with an automobile top having open sides, of guide members secured to the top on each side of the automobile, window supporting members adjustably mounted between the guide members, windows slidably mounted upon said members and adapted to close the open sides of the top, means for raising and lowering said supporting members whereby the lower edges of the windows are moved into and out of engagement with the upper edge of the body of the automobile, and means for pressing the lower edges of the windows into engagement with the upper edges of the body of the automobile when said supporting members are lowered.

3. The combination with the top of an automobile having open sides, of window supporting means adjustably mounted upon opposite sides of the top, windows slidable upon said means, and having their lower edges disposed to be moved into and out of engagement with the body of the automobile, means for raising and lowering said supporting means, and means for pressing the lower edges of said windows into engagement with the upper edges of the body of the automobile when said members are lowered.

4. The combination with an automobile top, of frames secured to said top on each side of the automobile, an upper window track adjustably supported between each frame, means for raising and lowering said track, a window slidable upon said track, the lower edge of said window being movable over the upper edge of the body of the automobile, and spring means against which the tracks are held in up-position, and which press the windows into engagement with the upper edge of the body of the automobile when the tracks are lowered.

5. The combination with an automobile top, of a window the lower edge of which is adjacent to the upper edge of the body of the automobile, a longitudinal track, means for slidably supporting said window upon said track, means for raising said track to raise the lower edge of the window relative to the upper edge of the body of the automobile, and spring means against the action of which said raising means is operated and which presses the lower edge of the window upon the upper edge of the body when the track is lowered.

6. The combination with an automobile top, of a window, the lower edge of which is adjacent to the upper edge of the automobile, a longitudinal track secured to said top, and means for slidably connecting the window with said track, rotary members secured to said top, flexible elements secured to said rotary members and the track, means for rotating said rotary members to raise and lower the track, and spring means for depressing said track to press the lower edge of the window into engagement with the upper edge of the body of the automobile.

7. The combination with an automobile top, of a track adjustably mounted upon said top, a window slidable upon the track, and having its lower edge disposed adjacent to the upper edge of the body of the automobile, a rotary member mounted in the top, a flexible element secured to said rotary member and to said track, an operating handle fixed to said rotary member, means to lock said handle against movement in one direction to maintain the track in raised position, and means for depressing the track and pressing the lower edge of the window into engagement with the upper edge of the body of the automobile, when the track is lowered.

8. The combination with an automobile top, of a track vertically adjustably secured to said top, a window slidable upon said track and having its lower edge disposed adjacent to the upper edge of the automobile, a pair of rotary members secured to said top above said track, a flexible element secured at its ends to the respective rotary members and intermediate of its ends to said track, means for rotating one of said rotary elements to raise and lower the track, and means to depress the track to press the lower edge of the window into engagement with the upper edge of the body of the automobile when the track is lowered.

9. In a device of the character described, a window supporting member, comprising channel bars secured in spaced relation to one another, spacing blocks interposed between said bars, a plate secured to one of said bars in spaced relation thereto, a spacing block interposed between said plate and one of said bars, longitudinally grooved blocks receiving certain flanges of said channel bars and slidable upon said channel bars, and windows secured to said blocks.

AUGUST H. PAPE.